United States Patent
Kwon et al.

(10) Patent No.: US 9,350,975 B2
(45) Date of Patent: May 24, 2016

(54) DISPLAY APPARATUS AND METHOD FOR APPLYING ON-SCREEN DISPLAY (OSD) THERETO

(75) Inventors: Ohjae Kwon, Suwon-si (KR); Young-wook Sohn, Yongin-si (KR); Lei Zhang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 290 days.

(21) Appl. No.: 13/078,144

(22) Filed: Apr. 1, 2011

(65) Prior Publication Data

US 2012/0044242 A1  Feb. 23, 2012

(30) Foreign Application Priority Data

Aug. 19, 2010  (KR) .................. 10-2010-0080387

(51) Int. Cl.
H04N 13/00  (2006.01)

(52) U.S. Cl.
CPC ........... H04N 13/007 (2013.01); H04N 13/004 (2013.01)

(58) Field of Classification Search
USPC ................................. 345/419, 418
See application file for complete search history.

(56) References Cited

U.S. PATENT DOCUMENTS

| | | | |
|---|---|---|---|
| 2005/0089212 A1* | 4/2005 | Mashitani et al. | 382/154 |
| 2008/0192067 A1* | 8/2008 | Barenbrug et al. | 345/607 |
| 2010/0021141 A1 | 1/2010 | Yamashita et al. | |
| 2010/0074594 A1* | 3/2010 | Nakamura et al. | 386/92 |
| 2010/0188572 A1 | 7/2010 | Card | |
| 2010/0201790 A1* | 8/2010 | Son et al. | 348/53 |
| 2011/0010666 A1* | 1/2011 | Choi | H04N 13/0011 715/810 |
| 2012/0013612 A1* | 1/2012 | Hwang | H04N 13/0022 345/419 |

FOREIGN PATENT DOCUMENTS

| | | |
|---|---|---|
| EP | 0 735 784 A2 | 10/1996 |
| WO | WO 2006/111893 A1 | 10/2006 |
| WO | WO 2010/046824 A1 | 4/2010 |

OTHER PUBLICATIONS

Communication dated Nov. 14, 2011, issued by the European Patent Office in corresponding European Patent Application No. 11177928.6.
Communication dated Jun. 24, 2014, issued by the European Patent Office in counterpart European Application No. 14162888.3.
Communication dated Mar. 30, 2015 issued by European Patent Office in counterpart European Application No. 11177928.6.
Communication dated Mar. 19, 2015 issued by European Patent Office in counterpart European Application No. 14162888.3.
Communication issued Sep. 23, 2015, issued by the European Patent Office in counterpart European Patent Application No. 14162888.3.

* cited by examiner

*Primary Examiner* — Ke Xiao
*Assistant Examiner* — Raffi Isanians
(74) *Attorney, Agent, or Firm* — Sughrue Mion, PLLC

(57) ABSTRACT

A display apparatus and a method for applying an OSD applying thereto. The display apparatus maintains the depth of the OSD to be displayed on the screen at a specific depth if the depth of a 3D image is adjusted. Accordingly, even if the depth of the 3D image is adjusted, the depth of the OSD remains the same. Therefore, a user may be provided with the OSD of which depth does not change even if the depth of the 3D image is adjusted.

39 Claims, 17 Drawing Sheets

DISPLAY APPARATUS AND METHOD FOR APPLYING ON-SCREEN DISPLAY (OSD) THERETO

CROSS-REFERENCE TO RELATED APPLICATION

This application claims priority from Korean Patent Application No. 2010-0080387, filed in the Korean Intellectual Property Office on Aug. 19, 2010, the disclosure of which is incorporated herein by reference in its entirety.

BACKGROUND

1. Field

Methods and apparatuses consistent with exemplary embodiments generally relate to a display apparatus and a method for providing an on-screen display (OSD) thereto, and more particularly, to a display apparatus which displays a three-dimensional (3D) image with an OSD and a method for applying an OSD thereto.

2. Description of the Prior Art

A 3D stereoscopic image technology is applicable to various fields such as information communication, broadcasting, medicine, education & training, military, games, animation, virtual reality, computer-aided design (CAD), and industrial technology, and is regarded as a core base technology for the next generation 3D stereoscopic multimedia information communication, which is required in all the aforementioned fields.

Generally, a stereoscopic sense that a person perceives occurs from a complex effect of the degree of change of thickness of the person's eye lens according to the location of an object to be observed, the angle difference of the object observed from both eyes, the differences of location and shape of the object observed from both eyes, the time difference due to movement of the object, and other various psychological and memory effects.

In particular, binocular disparity, caused by about a 6~7 cm lateral distance between the person's left eye and right eye, can be regarded as the main cause of the stereoscopic sense. Due to binocular disparity, the person perceives the object with an angle difference, which makes the left eye and the right eye receive different images, and when these two images are transmitted to the person's brain through retinas, the brain can perceive the original 3D stereoscopic image by combining the two pieces of information exactly.

There are two types of stereoscopic image display apparatuses: glasses-type apparatuses which use special glasses, and nonglasses-type apparatuses which do not use such special glasses. A glasses-type apparatus may adopt a color filtering method which separately selects images by filtering colors which are in mutually complementary relationships, a polarized filtering method which separates the images received by a left eye from those received by a right eye using a light-shading effect caused by a combination of polarized light elements meeting at right angles, or a shutter glasses method which enables a person to perceive a stereoscopic sense by blocking a left eye and a right eye alternately in response to a sync signal which projects a left eye image signal and a right eye image signal to a screen.

A 3D image consists of a left eye image perceived by a left eye and a right eye image perceived by a right eye. A 3D display apparatus creates a stereoscopic sense using the time difference between the left eye image and the right eye image.

In some cases, a 3D display apparatus has to display an OSD menu. In this case, if the depth of a 3D image changes while the OSD menu is displayed, the depth of the OSD also changes, thereby changing the depth of the OSD perceived by a user.

A user wishes to view a normal OSD when using a display apparatus. Therefore, a method for providing an OSD with no changes in the depth of the OSD in a 3D display apparatus is required.

SUMMARY

Aspects of the exemplary embodiments relate to a display apparatus which controls the depth of an OSD displayed on a screen to be maintained at a specific depth while the depth of a 3D image is adjusted and a method for applying an OSD thereto.

A display apparatus displaying a 3D image, according to an exemplary embodiment, includes a depth adjusting unit which adjusts a depth of the 3D image and a controlling unit which, if the depth of the 3D image is adjusted, controls to maintain a depth of an OSD to be displayed on a screen at a specific depth.

The apparatus may further include an OSD inserting unit which generates and inserts an OSD to the 3D image.

The controlling unit may maintain the depth of an OSD to be displayed on a screen at a specific depth by controlling the OSD inserting unit to insert the OSD by inversely applying a depth adjusting value.

The controlling unit may maintain the depth of an OSD to be displayed on a screen at a specific depth by recognizing an area where the OSD is displayed based on information regarding a location where the OSD is inserted and adjusting a depth in areas excluding the area where the OSD is displayed.

The OSD inserting unit may insert an OSD to a 3D image of which depth is adjusted by the depth adjusting unit.

The 3D image may be input from an external apparatus while including an OSD.

The controlling unit may maintain the depth of an OSD to be displayed on a screen at a specific depth by detecting information regarding a location of the OSD, recognizing an area where the OSD is displayed based on the detected information regarding a location of the OSD, and adjusting a depth in areas excluding the area where the OSD is displayed.

The controlling unit may maintain the depth of an OSD to be displayed on a screen at a specific depth by receiving information regarding a location of the OSD from the external apparatus, recognizing an area where the OSD is displayed based on the received information regarding a location of the OSD, and adjusting a depth in areas excluding the area where the OSD is displayed.

The controlling unit may maintain the depth of an OSD to be displayed on a screen at a specific depth by deactivating a depth adjusting function of the depth adjusting unit if a 3D image including an OSD is received.

The specific depth may be a depth corresponding to a location of a screen of a display apparatus.

The specific depth may correspond to a depth of an image surrounding an area where the OSD is displayed.

The specific depth may correspond to a deepest depth in the 3D image.

A method for providing an OSD in a display apparatus displaying a 3D image, according to an exemplary embodiment, includes receiving a 3D image, adjusting a depth of the 3D image, and if the depth of the 3D image is adjusted, maintaining a depth of an OSD to be displayed on a screen at a specific depth.

The method may further include generating and inserting an OSD to the 3D image.

The maintaining may include maintaining the depth of an OSD to be displayed on a screen at a specific depth by inserting the OSD by inversely applying the depth adjusting value.

The maintaining may include recognizing an area where the OSD is displayed based on information regarding a location where the OSD is inserted and maintaining the depth of an OSD to be displayed on a screen at a specific depth by adjusting a depth in areas excluding the area where the OSD is displayed.

The inserting may include inserting an OSD to a 3D image of which depth is adjusted.

The receiving may include receiving a 3D image to which the OSD is inserted from an external apparatus.

The maintaining may include detecting information regarding a location of the OSD from the received 3D image, recognizing an area where the OSD is displayed based on the detected information regarding a location of the OSD, and maintaining the depth of an OSD to be displayed on a screen at a specific depth by adjusting a depth in areas excluding the area where the OSD is displayed.

The maintaining may include receiving information regarding a location of the OSD from the external apparatus, recognizing an area where the OSD is displayed based on the received information regarding a location of the OSD, and maintaining the depth of an OSD to be displayed on a screen at a specific depth by adjusting a depth in areas excluding the area where the OSD is displayed.

The maintaining may include maintaining the depth of an OSD to be displayed on a screen at a specific depth by deactivating a depth adjusting function if a 3D image including an OSD is received.

The specific depth may be a depth corresponding to a location of a screen of a display apparatus.

The specific depth may correspond to a depth of an image surrounding an area where the OSD is displayed.

The specific depth may correspond to a deepest depth in the 3D image.

As described above, according to the various exemplary embodiments, a display apparatus which maintains the depth of an OSD at a specific depth if the depth of a 3D image is adjusted and a method for providing an OSD applying thereto are provided. Therefore, even if the depth of the 3D image is adjusted, the depth of the OSD is maintained. Accordingly, a user may be provided with an OSD of which depth does not change even if the depth of a 3D image is adjusted.

BRIEF DESCRIPTION OF THE DRAWINGS

The above and/or other aspects of the present disclosure will be more apparent by describing certain exemplary embodiments with reference to the accompanying drawings, in which.

DETAILED DESCRIPTION

Figure 1:
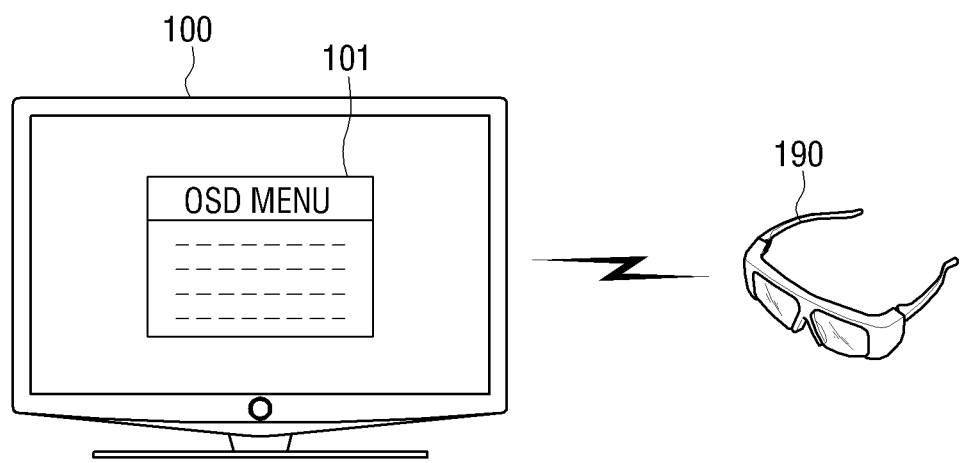
FIG. 1 is a schematic view illustrating the exterior view of a television (TV) according an exemplary embodiment.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a schematic view illustrating the exterior view of a 3D TV 100 according an exemplary embodiment. As illustrated in FIG. 1, the 3D TV 100 may communicate with 3D glasses 190.

The 3D TV 100 generates and displays a left eye image and a right eye image alternately, and a user may watch a 3D stereoscopic image by viewing the left eye image and the right eye image displayed on the 3D TV 100 through a left eye and a right eye alternately using the 3D glasses 190.

Specifically, the 3D TV 100 generates a left eye image and a right eye image and displays the generated left eye image and the generated right eye image alternately on a screen at predetermined time intervals.

The 3D TV 100 generates a sync signal for the generated left eye image and the generated right eye image and transmits the sync signal to the 3D glasses 190.

The 3D glasses 190 receives the sync signal transmitted from the 3D TV 100 and opens left eye glasses and right eye glasses alternately to be synchronized with the left eye image and the right eye image displayed on the 3D TV 100.

As such, a user may watch a 3D image using the 3D TV 100 and the 3D glasses 190 in FIG. 1.

In addition, the 3D TV 100 may display an OSD menu 101 together with a 3D image on the screen. The OSD menu 101 is required to set various functions of the 3D TV 100.

In this case, the 3D TV 100 displays the OSD such that it is included in the left eye image and the right eye image having a specific depth. Specifically, the 3D TV 100 may display the OSD to have a depth corresponding to a location of the screen.

Even if the depth of a 3D image changes, the 3D TV 100 may keep the OSD menu 101 to have a specific depth. When the OSD menu 101 is displayed, a user usually focuses on the OSD menu 101 and does not wish to be distracted as the OSD menu 101 moves unnecessarily or the depth of the OSD menu 101 changes.

Accordingly, the 3D TV 100 maintains the depth of the OSD menu 101 at a specific level regardless of a change in the depth of the 3D image.

Figure 2:
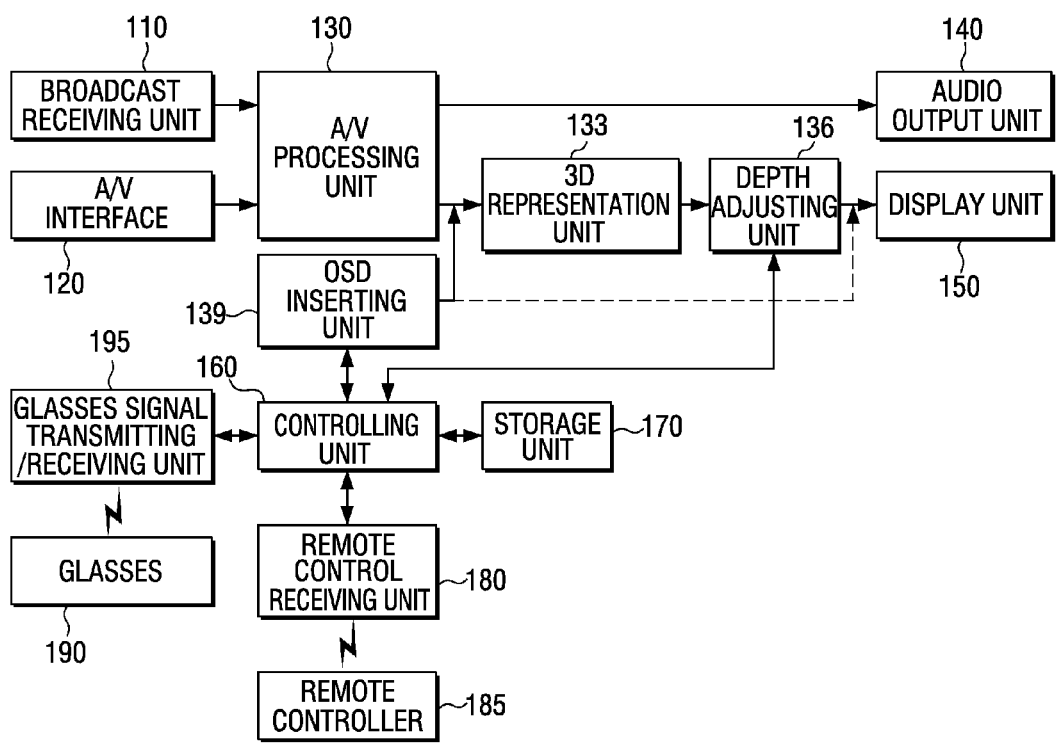
FIG. 2 is a block diagram illustrating the detailed configuration of a TV according to an exemplary embodiment.

FIG. 2 is a block diagram illustrating the detailed configuration of a TV according to an exemplary embodiment. As illustrated in FIG. 2, the 3D TV 100 comprises a broadcast receiving unit 110, an A/V interface 120, an A/V processing unit 130, a 3D representation unit 133, a depth adjusting unit 136, an OSD inserting unit 139, an audio output unit 140, a display unit 150, a controlling unit 160, a storage unit 170, a remote control receiving unit 180, and a glasses signal transmitting/receiving unit 195.

The broadcast receiving unit 110 receives broadcast from a broadcasting station or a satellite via wire or wirelessly and demodulates the received broadcast. In addition, the broadcast receiving unit 110 receives a 3D image signal including 3D image data.

The A/V interface 120 is connected to an external apparatus, and receives an image from the external apparatus. In particular, the A/V interface 120 may receive 3D image data from the external apparatus. The A/V interface 120 may perform interfacing of S-Video, component, composite, D-Sub, DVI, HDMI, and the like.

Herein, the 3D image data means data including 3D image information. The 3D image data includes left eye image data and right eye image data in one data frame region. The 3D image data may be classified into, for example, an interleave method, a side-by-side method, and an above-below method, depending on how left eye image data and right eye image data are included in the frame region.

The A/V processing unit 130 performs signal processing, such as video decoding, video scaling, audio decoding, and the like, with respect to an image signal and an audio signal input from the broadcast receiving unit 110 and the A/V interface 120.

Specifically, the A/V processing unit 130 performs signal processing such as audio decoding on an input audio signal. In addition, the A/V processing unit 130 outputs the processed audio signal to the audio output unit 140.

The A/V processing unit 130 performs signal processing such as video decoding and video scaling on an input image signal. In addition, the A/V processing unit 130 outputs input 3D image data to the 3D representation unit 133 if 3D image data is input.

The 3D representation unit 133 generates a left eye image and a right eye image interpolated with a size of one frame using the input 3D image data. That is, the 3D representation unit 133 generates the left eye image and the right eye image to be displayed on the screen to represent the 3D stereoscopic image.

Specifically, the 3D representation unit 133 separates the input 3D image data into the left eye image and the right eye image. Since one frame data includes the left eye image and the right eye image, the separated left eye image data or right eye image data corresponds to a half of the whole screen size. Accordingly, the 3D representation unit 133 generates the left eye image and the right eye image to be displayed on the screen having the whole screen size by twice enlarging or interpolating the left eye image data and the right eye image data.

In addition, the 3D representation unit 133 outputs the generated left eye image and the right eye image to a depth adjusting unit 136 for adjusting the depth.

The depth adjusting unit 136 adjusts the depth of the input 3D image under the control of the controlling unit 160. If the depth of the 3D image is too deep, a user may feel dizzy while watching the 3D image. In order to adjust the stereoscopic sense of the 3D image to reflect user preference, the depth adjusting unit 136 adjusts the depth according to the user's manipulation. In addition, the depth adjusting unit 136 may automatically change the depth of the 3D image to an appropriate value.

The OSD inserting unit 139 generates an OSD to be displayed for a user and inserts the generated OSD to a 3D image. The OSD inserting unit 139 inserts the generated OSD to the input 3D image data before the 3D image data is input to the 3D representation unit 136. Accordingly, the 3D image data to which the OSD is inserted is input to the 3D representation unit 136.

However, the OSD inserting unit 139 may insert the OSD to the 3D image after the depth of the 3D image is adjusted by the depth adjusting unit 136 so as to prevent the depth of the OSD from being changed by the depth adjusting unit 136. This will be explained in detail with reference to FIGS. 9 and 10.

The audio output unit 140 outputs audio transmitted from the A/V processing unit 130 through a speaker and the like.

The display unit 150 outputs an image transmitted from the depth adjusting unit 136 to be displayed on the screen. Particularly, in the case of a 3D image, the display unit 150 outputs a left eye image and a right eye image alternately on the screen.

The storage unit 170 stores an image received from the broadcast receiving unit 110 or the interface 120. The storage unit 170 may be embodied as a hard disk, a non-volatile memory, and the like.

The remote control receiving unit 180 receives a user's manipulation from the remote controller 185, and transmits the received manipulation to the controlling unit 160.

The glass signal transmitting/receiving unit 195 transmits a clock signal for alternately opening the left eye glass and the right eye glass of the glasses 190, and the glasses 190 alternately open the left eye glass and the right eye glass in accordance with the received clock signal.

The controlling unit 160 identifies a user command based on a user manipulation transmitted from the remote controller 185 and controls the overall operation of the 3D TV 100 in accordance with the user command.

Specifically, the controlling unit 160 controls the depth of the OSD to be displayed on the screen to be at a specific depth even if the depth of the 3D image is adjusted.

Herein, the specific depth may be a depth corresponding to a screen location of the 3D TV 100, so that a user may feel as if the OSD is displayed on the screen of the 3D TV 100.

Alternatively, the specific depth of the OSD may correspond to the depth of surrounding 3D images so that the OSD may be harmonious with surrounding 3D images.

The specific depth may be the deepest depth within the 3D image so that it looks as if the OSD is in the very front of all 3D images and thus, the OSD is not blocked by other 3D images.

Specifically, if the OSD is generated by the OSD inserting unit 139 included in the 3D TV 100, the controlling unit 160 may maintain the depth of the OSD using the following three methods:

Firstly, the controlling unit 160 may control the OSD inserting unit 139 to insert an OSD by inversely adjusting the depth of the OSD using a depth adjusting value so as to maintain the depth of the OSD to be displayed on the screen at a specific depth.

For example, if the depth of a 3D image is adjusted from +2 to +1 by the depth adjusting unit 136, a depth adjusting value becomes −1. In this case, the controlling unit 160 controls the OSD inserting unit 139 so that the OSD is inserted to a location where the depth of the OSD becomes +1. Since the depth of the 3D image is adjusted after the OSD is inserted, the ultimate depth value of the OSD becomes 0. This will be explained in detail with reference to FIGS. 5 to FIG. 6B.

As such, the controlling unit 160 may maintain the specific depth of an OSD by inversely applying a depth adjusting value.

Secondly, the controlling unit 160 may recognize an area where an OSD is displayed based on information regarding a location to which the OSD is inserted and adjust the depth of an area excluding the OSD area so as to maintain the depth of the OSD to be displayed on the screen at a specific depth. In this case, the information regarding a location to which the OSD is inserted may include information regarding the coordinates of the OSD and the size of the OSD, or may be information in the form of bitmap. This will be explained in detail with reference to FIGS. 7 and 8.

Thirdly, if an OSD is displayed, the controlling unit 160 may maintain the depth of the OSD to be displayed on the screen at a specific depth by deactivating the depth adjusting function of the depth adjusting unit 136. If an OSD is displayed, a user usually focuses on the OSD rather than the image screen. Therefore, the user may not feel dizzy even though the depth of a 3D image is not adjusted. Accordingly, if an OSD is displayed on the screen, the controlling unit 160 may deactivate the depth adjusting function so as not to change the depth of the OSD. This will be explained in detail with reference to FIG. 11.

Meanwhile, the AV interface 120 may receive a 3D image to which an OSD is inserted from an external apparatus. In this case, the OSD displayed on the screen is related to the functions of the external apparatus. For example, if the external apparatus is a BD player, the A/V interface 120 may receive a 3D image to which an OSD regarding a BD player menu is inserted from the BD player.

In this case, the controlling unit 160 detects information regarding the location of the OSD from the input 3D image. For example, the controlling unit 160 may detect an area with no movement in the 3D image as an OSD area since there is no movement of image in the OSD area. If a boundary is a vertical or horizontal straight line, or a specific curve or diagram, the controlling unit 160 may recognize the inside of the boundary as an OSD area.

The controlling unit 160 recognizes an OSD area based on detected information regarding the location of an OSD. Subsequently, the controlling unit 160 adjusts the depth of areas excluding the OSD area so as to maintain the depth of the OSD to be displayed on the screen at a specific depth.

However, if an external apparatus transmits information regarding an OSD location along with a 3D image, the controlling unit 160 may not go through the process of detecting the OSD area and may recognize the OSD area based on the received information regarding the OSD location.

This will be explained in detail with reference to FIGS. 12 and 13.

If a 3D image including an OSD is received, the controlling unit 160 may maintain the depth of the OSD to be displayed on the screen at a specific depth by deactivating the depth adjusting function of the depth adjusting unit 136. If an OSD is displayed, a user usually focuses on the OSD rather than the image screen. Therefore, the user may not feel dizzy even though the depth of a 3D image is not adjusted. Accordingly, if a 3D image to which an OSD is inserted is input, the controlling unit 160 may deactivate the depth adjusting function so as not to change the depth of the OSD. This will be explained in detail with reference to FIG. 14.

As described above, the 3D TV 100 maintains the depth of an OSD at a specific depth even if the depth of the 3D image is adjusted. Accordingly, a user may view a stable OSD without any changes in its depth through the 3D TV 100.

Figure 3:
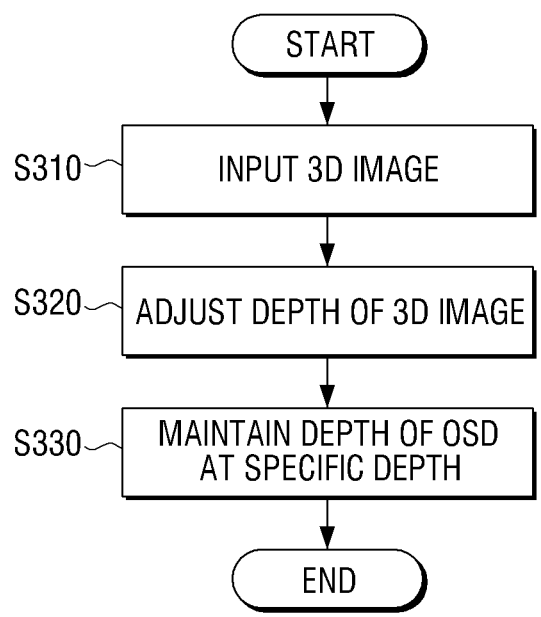
FIG. 3 is a flowchart to explain a method for providing an OSD according to an exemplary embodiment.

Hereinafter, a method for providing an OSD of the 3D TV 100 will be explained in detail with reference to FIG. 3. FIG. 3 is a flowchart to explain a method for providing an OSD according to an exemplary embodiment.

The 3D TV 100 receives a 3D image (S310), and adjusts the depth of the 3D image according to a user's manipulation or automatically adjusts the depth of the 3D image (S320).

In this case, the 3D TV 100 maintains the depth of the OSD to be displayed on the screen at a specific depth (S330). The 3D TV 100 may maintain the depth of the OSD at a specific depth using the methods below.

If the OSD is generated by the OSD inserting unit 139 included in the 3D TV 100, the 3D TV 100 may maintain the depth of the OSD using the following four methods:

Firstly, the 3D TV 100 may maintain the depth of the OSD to be displayed on the screen at a specific depth by inserting the OSD of which depth is inversely adjusted using a depth adjusting value to a 3D image.

For example, if the depth of a 3D image is adjusted from +2 to +1 by the 3D TV 100, a depth adjusting value becomes −1. In this case, the 3D TV 100 inversely applies a depth adjusting value (−1) to the specific depth (a depth value: 0) of the OSD and inserts the OSD to a location where the depth of the OSD becomes +1. Since the depth of the 3D image is adjusted after the OSD is inserted, the ultimate depth value of the OSD becomes 0. This will be explained in detail with reference to FIG. 5 to FIG. 6B.

As such, the 3D TV 100 may maintain the specific depth of an OSD by inversely applying a depth adjusting value.

Secondly, the 3D TV 100 may recognize an area where an OSD is displayed based on information regarding a location to which the OSD is inserted, and adjust the depth of an area excluding the OSD area so as to maintain the depth of the OSD to be displayed on the screen at a specific depth. This will be explained in detail with reference to FIGS. 7 and 8.

Thirdly, if an OSD is displayed, the 3D TV 100 may maintain the depth of the OSD to be displayed on the screen at a specific depth by deactivating a depth adjusting function. If an OSD is displayed, a user usually focuses on the OSD rather than the image screen. Therefore, the user may not feel dizzy even though the depth of a 3D image is not adjusted. Accordingly, if an OSD is displayed on the screen, the 3D TV 100 may deactivate the depth adjusting function so as not to change the depth of the OSD. This will be explained in detail with reference to FIG. 11.

The above three methods may be applied when a depth is adjusted after an OSD is inserted. However, the OSD may be applied after the depth is adjusted as follows:

Fourthly, the 3D TV 100 may insert an OSD after the depth of a 3D image is adjusted. To do so, the OSD inserting unit 139 may be disposed in the next step of the depth adjusting unit 136 in the 3D TV 100 to prevent the depth of the OSD from being changed by the depth adjusting unit 136. This will be explained in detail with reference to FIGS. 9 and 10.

Meanwhile, the 3D TV 100 may receive a 3D image to which an OSD is inserted from an external apparatus. In this case, the OSD displayed on the screen is related to the functions of the external apparatus. For example, if the external apparatus is a BD player, the A/V interface 120 may receive a 3D image to which an OSD regarding a BD player menu is inserted from the BD player.

In this case, the 3D TV 100 detects information regarding the location of the OSD from the input 3D image. For example, the 3D TV 100 may detect an area with no movement in the 3D image as an OSD area since there is no movement of image in the OSD area. If a boundary is a vertical or horizontal straight line, or a specific curve or diagram, the 3D TV 100 may recognize the inside of the boundary as an OSD area.

The 3D TV 100 recognizes an OSD area based on detected information regarding a location of an OSD. Subsequently, the 3D TV 100 adjusts the depth of areas excluding the OSD area so as to maintain the depth of the OSD to be displayed on the screen at a specific depth.

However, if an external apparatus transmits information regarding an OSD location along with a 3D image, the 3D TV 100 may not go through the process of detecting the OSD area and may recognize the OSD area based on the received information regarding the OSD location.

This will be explained in detail with reference to FIGS. 12 and 13.

In addition, if a 3D image including an OSD is received, the 3D TV 100 may maintain the depth of the OSD to be displayed on the screen at a specific depth by deactivating a depth adjusting function. If an OSD is inserted to a 3D image, a user usually focuses on the OSD rather than the image screen. Therefore, the user may not feel dizzy even though the depth of a 3D image is not adjusted. Accordingly, if a 3D image to which an OSD is inserted is input, the 3D TV 100 may deactivate the depth adjusting function so as not to change the depth of the OSD. This will be explained in detail with reference to FIG. 14.

As described above, the 3D TV 100 maintains the depth of an OSD at a specific depth even if the depth of the 3D image is adjusted. Accordingly, a user may view a stable OSD without any changes in its depth via the 3D TV 100.

Figure 4A:
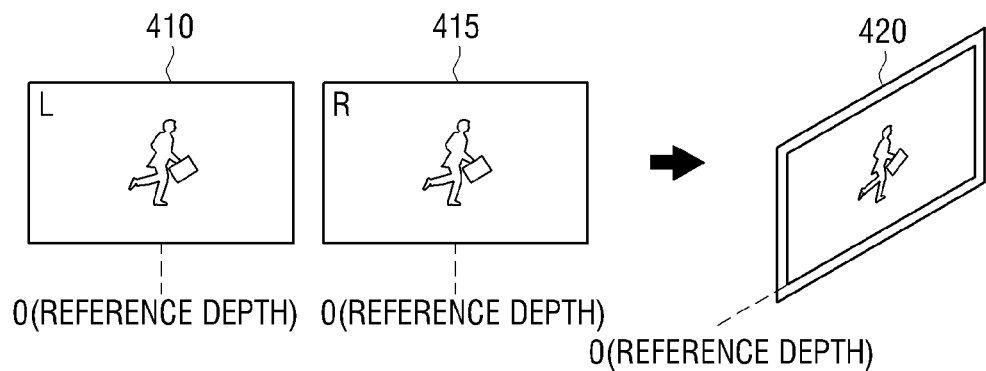
FIGS. 4A to 4C are views illustrating the process of adjusting a depth according to an exemplary embodiment.
Figure 4B:
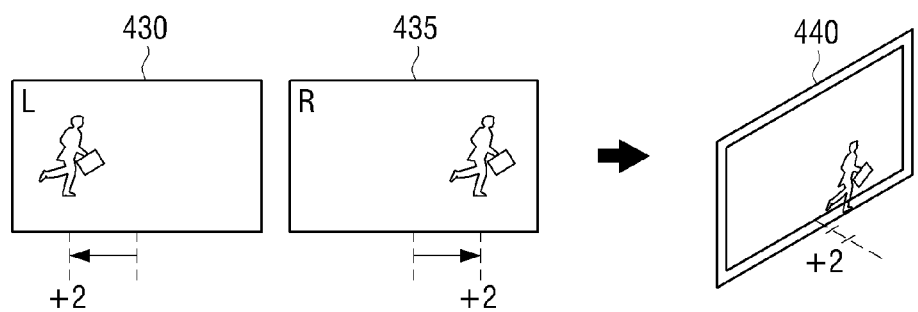
Figure 4C:
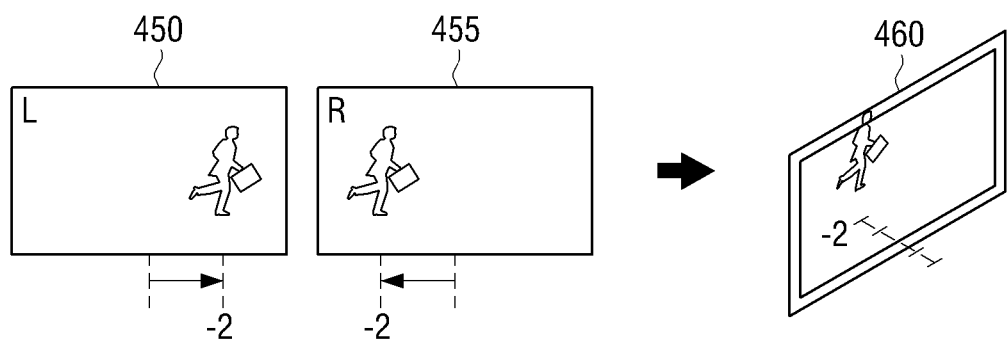

FIGS. 4A to 4C are views illustrating the process of adjusting a depth according to an exemplary embodiment.

FIG. 4A illustrates a case where a left eye image 410 and a right eye image 415 have a reference depth value (a depth value: 0). As such, if the left eye image 410 and the right eye image 415 have a reference depth value (a depth value: 0), a 3D image 420 is displayed as if the image is displayed on the surface of the display screen.

FIG. 4B illustrates a case where the depth values of a left eye image 430 and a right eye image 435 are +2 respectively. Herein, if the depth value is a positive value, the 3D image is displayed as if the image protrudes from the display screen (that is, the image looks closer to a user).

If the depth value is a positive value, the left eye image 430 moves in the left and the right eye image 435 moves in the right. That is, the farther the distance between the left eye image 430 and the right eye image 435, the higher the positive depth value and the closer the 3D image in the direction of the user.

As such, if the depth values of the left eye image 430 and the right eye image 435 are +2 respectively, the 3D image 440 is displayed as if the image is located in front of the display screen.

FIG. 4C illustrates a case where the depth values of a left eye image 450 and a right eye image 455 are −2 respectively. Herein, if the depth value is a negative value, the 3D image is displayed as if the image retreats from the display screen (that is, the image looks distant from a user).

If the depth value is a negative value, the left eye image 450 moves in the right and the right eye image 455 moves in the left. That is, the closer the distance between the left eye image 450 and the right eye image 455, the higher the negative absolute depth value and the farther the 3D image appears inside the screen from the surface of the screen.

As such, if the depth values of the left eye image 450 and the right eye image 455 are −2 respectively, the 3D image 460 is displayed as if the image is located in the back of the display screen.

Hereinafter, various methods for maintaining the dept of an OSD will be explained.

Firstly, a method for inserting an OSD by inversely applying a depth adjusting value will be explained with reference to FIG. 5 to FIG. 6B.

Figure 5:
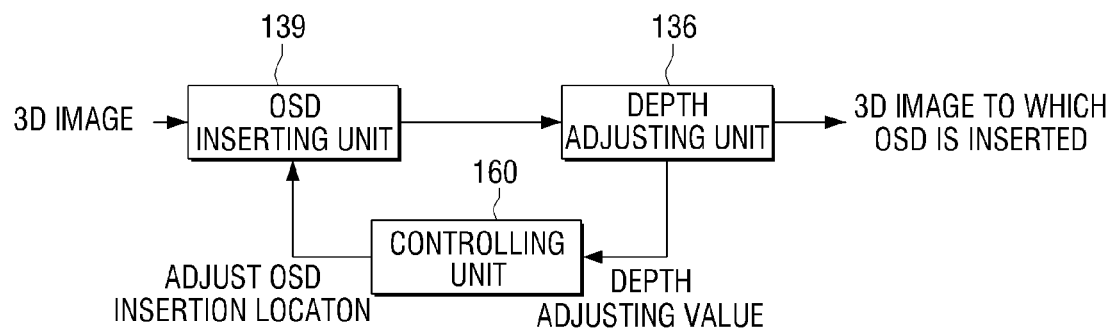
FIG. 5 is a schematic view illustrating a configuration for inserting an OSD and adjusting a depth according to an exemplary embodiment.

FIG. 5 is a schematic view illustrating a configuration for inserting an OSD and adjusting a depth according to an exemplary embodiment.

As illustrated in FIG. 5, the controlling unit 160 receives the depth adjusting value of a current 3D image from the depth adjusting unit 136. Subsequently, the controlling unit 160 controls the OSD inserting unit 139 to adjust a location where the OSD is to be inserted by inversely applying the depth adjusting value, which will be explained with reference to FIGS. 6A and 6B.

Figure 6A:
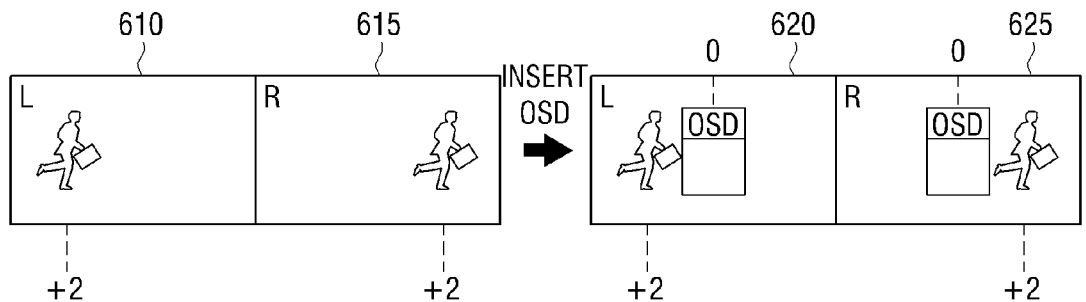
FIGS. 6A and 6B are views illustrating the process of determining a location where an OSD is to be inserted taking a depth value into consideration.
Figure 6B:
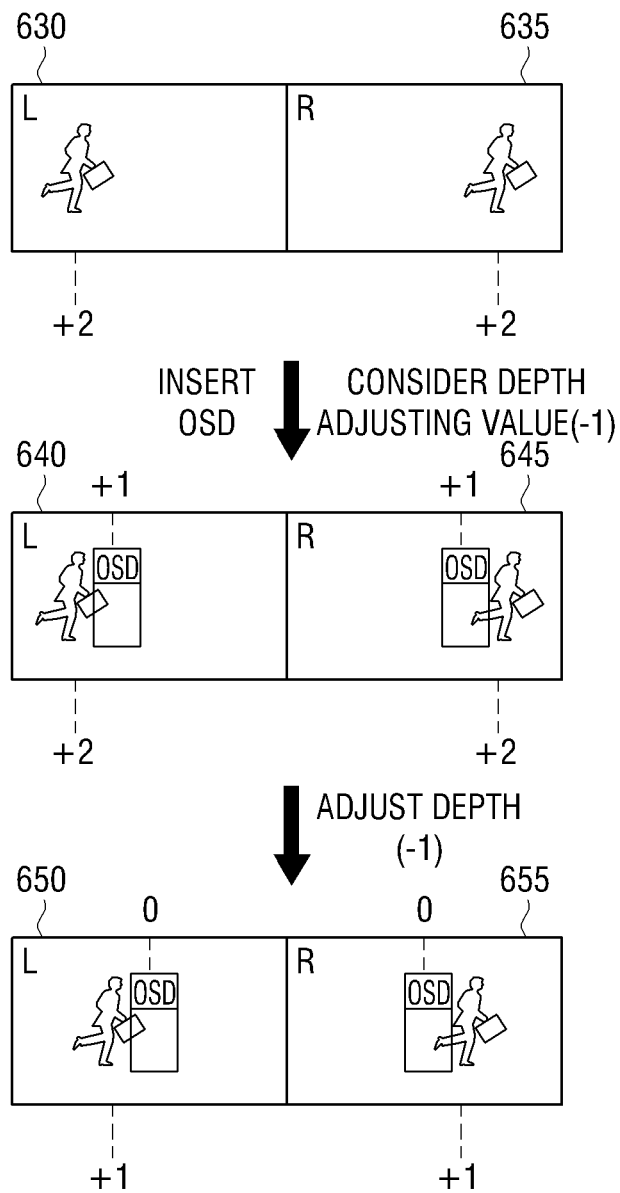

FIGS. 6A and 6B are views illustrating the process of determining a location where an OSD is to be inserted taking a depth value into consideration. In FIGS. 6A and 6B, the numbers below the 3D image refer to the depth values of the 3D image and the numbers above the OSD refer to the depth values of the OSD.

FIG. 6A illustrates the process of inserting an OSD when there is no adjustment in the depth values. As illustrated in FIG. 6A, the depth values of the left eye image 610 and the right eye image 615 constituting the input 3D image are +2 respectively.

In this case, if the OSD is inserted, the OSD is inserted to a location corresponding to the surface of the screen where the depth value is 0. Accordingly, it can be seen that the OSD is inserted to a location where the depth value is 0 in the left eye image 620 and the right eye image 625.

FIG. 6B illustrates the process of inserting an OSD when there is adjustment in the depth values. As illustrated in FIG. 6B, the depth values of the left eye image 630 and the right eye image 635 constituting the input 3D image are +2 respectively. In the case of FIG. 6B, the depth adjusting value is −1.

In this case, if the OSD is inserted, the 3D TV 100 adjusts a location where the OSD is to be inserted by inversely applying the depth adjusting value. That is, as illustrated in FIG. 6B, the 3D TV 100 inserts the OSD so that the depth value becomes +1 by inversely applying the depth adjusting value of −1. Accordingly, it can be seen that the depth values of the OSD in the left eye image 640 and the right eye image 645 are +1 respectively.

Ultimately, after the depth adjustment, the depths of the left eye image 650 and the right eye image 655 become +1 and the depth of the OSD becomes 0.

If the above process is repeated, the 3D TV 100 may maintain the depth value of the OSD to be 0 by inversely applying a depth adjusting value regardless of depth adjustment.

Secondly, a method for maintaining the depth of an OSD as the 3D TV 100 recognizes the OSD area based on information regarding a location where the OSD is inserted and adjusts the depth in areas excluding the OSD area will be explained with reference to FIGS. 7 and 8.

Figure 7:
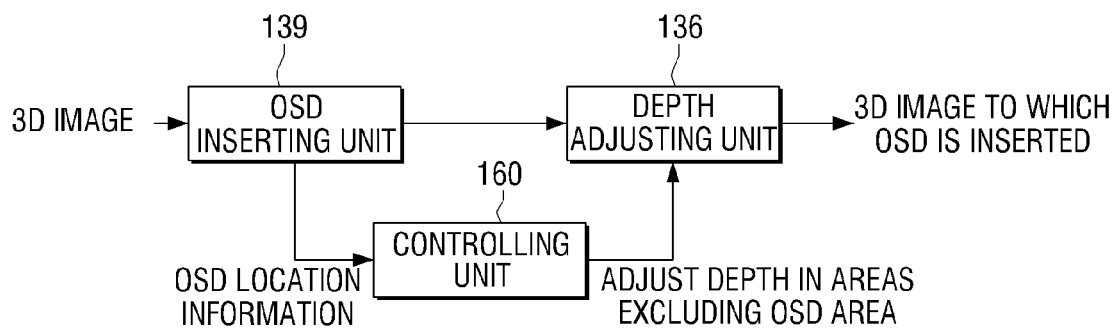
FIG. 7 is a schematic view illustrating a configuration for inserting an OSD and adjusting a depth according to another exemplary embodiment.

FIG. 7 is a schematic view illustrating a configuration for inserting an OSD and adjusting a depth according to another exemplary embodiment.

As illustrated in FIG. 7, the controlling unit 160 receives information regarding an OSD location from the OSD inserting unit 139, and recognizes an area where the OSD is displayed based on the received information regarding the OSD insertion location. Subsequently, the controlling unit 160 controls the depth adjusting unit 136 to adjust the depth in areas excluding the area where the OSD is displayed. Accordingly, the 3D TV 100 may control to maintain the depth of an OSD to be displayed on the screen at a specific depth, and this will be explained with reference to FIG. 8 by considering an example.

Figure 8:
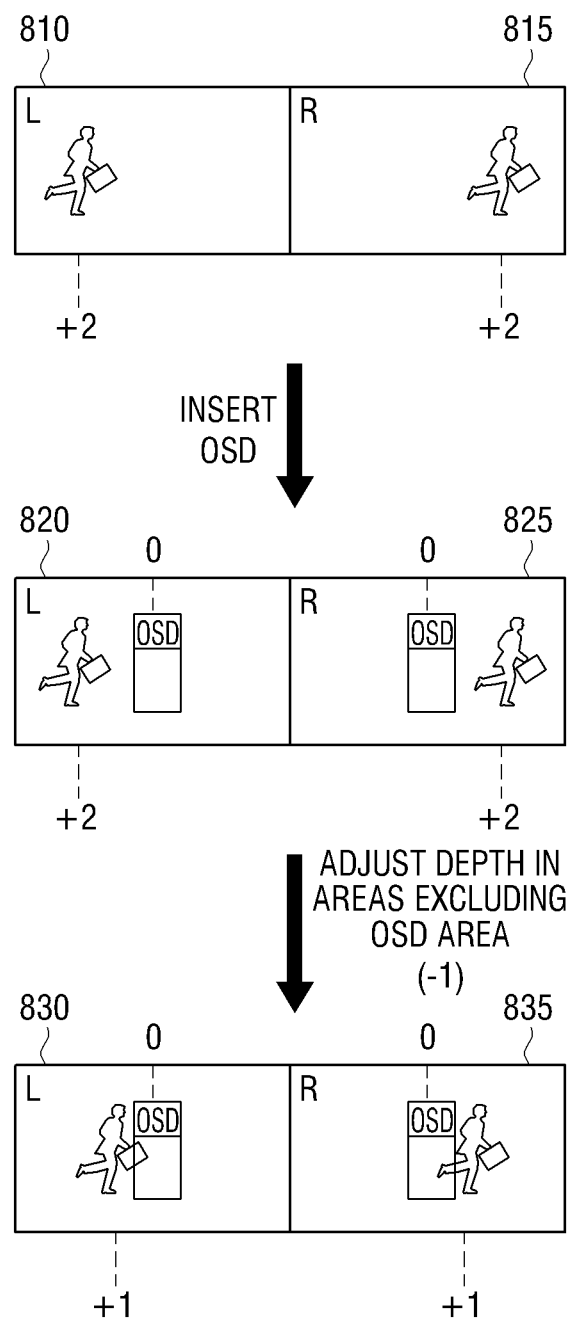
FIG. 8 is a view illustrating the process of adjusting a depth in an area except for an OSD according to another exemplary embodiment.

FIG. 8 is a view illustrating the process of adjusting a depth in an area except for an OSD according to another exemplary embodiment. The numbers below the 3D image refer to the depth values of the 3D image and the numbers above the OSD refer to the depth values of the OSD.

As illustrated in FIG. 8, the depth values of the left eye image 810 and the right eye image 815 constituting the input 3D image are +2 respectively. In case of FIG. 8, a depth adjusting value is −1.

In this case, if the OSD is inserted, the 3D TV 100 inserts the OSD to a location where the depth value is 0. As illustrated in FIG. 8, it can be seen that the OSD is inserted to a location where the depth value is 0 in the left eye image 820 and the right eye image 825 to which the OSD is already inserted.

Subsequently, the 3D TV 100 identifies an area where the OSD is displayed using information regarding a location where the OSD is inserted and adjusts the depth in areas excluding the OSD area.

Accordingly, if depth adjustment is performed, the depth value of the OSD is not changed and only the depth value of the 3D image is changed. That is, as illustrated in FIG. 8, in the left eye image 830 and the right eye image 835 after depth adjustment is completed, it can be seen that the depth value of the 3D image is adjusted from +2 to +1 while the depth value of the OSD remains at 0.

If the above process is repeated, the 3D TV 100 may maintain the depth value of the OSD at 0 regardless of depth adjustment.

Thirdly, a method for disposing the operations of OSD inserting unit 139 after the operations of the depth adjusting unit 136 will be explained with reference to FIGS. 9 and 10.

Figure 9:
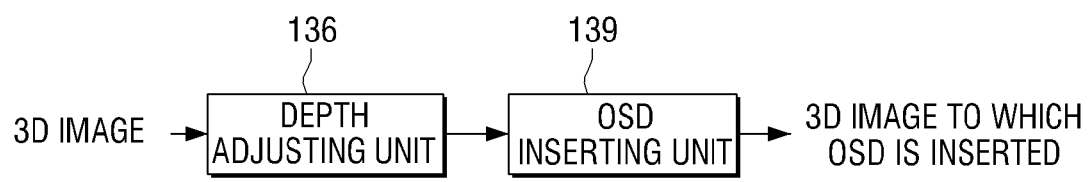
FIG. 9 is a schematic view illustrating a configuration where a depth adjusting unit is disposed in front of an OSD inserting unit according to another exemplary embodiment.

FIG. 9 is a schematic view illustrating a configuration where the depth adjusting unit 136 is disposed before an OSD inserting unit 139 according to another exemplary embodiment. As illustrated in FIG. 9, the depth of the 3D image is adjusted by the depth adjusting unit 136 and the OSD is inserted by the OSD inserting unit 139. Accordingly, the 3D TV 100 may insert the OSD having a certain depth regardless of depth adjustment. This will be explained in detail with reference to FIG. 10.

Figure 10:
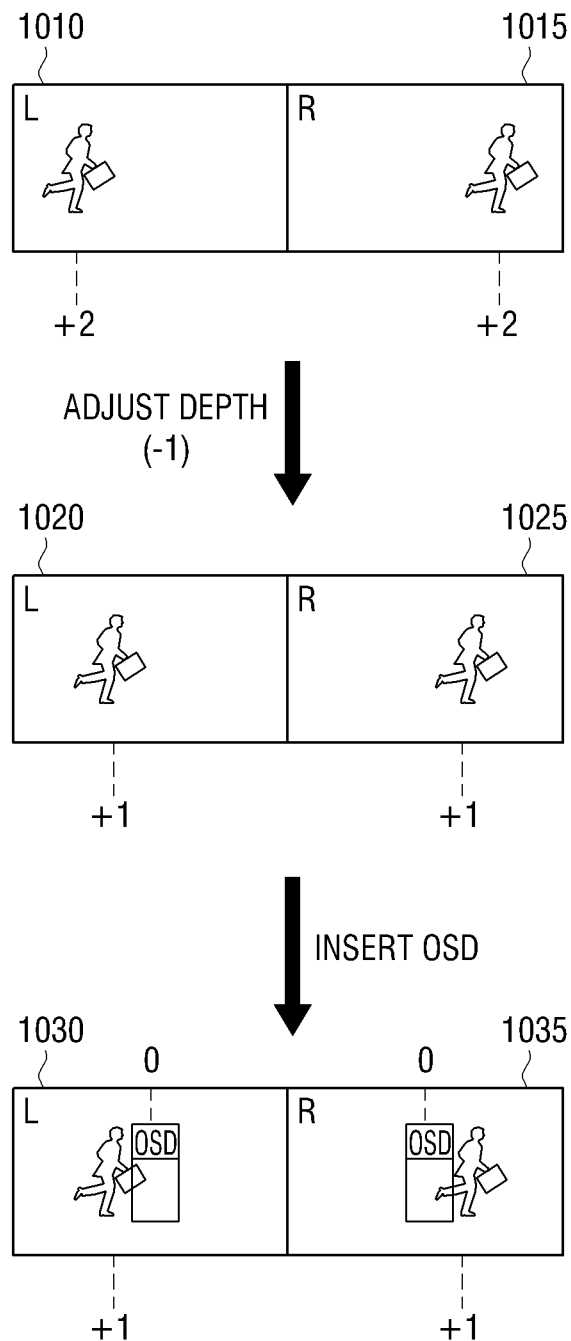
FIG. 10 is a view illustrating the process of adjusting a depth prior to inserting an OSD according to another exemplary embodiment.

FIG. 10 is a view illustrating the process of adjusting a depth prior to inserting an OSD according to another exemplary embodiment. In FIG. 10, the numbers below the 3D image refer to the depth values of the 3D image and the numbers above the OSD refer to the depth values of the OSD.

As illustrated in FIG. 10, the depth values of the left eye image 1010 and the right eye image 1015 constituting the input 3D image are +2 respectively. In case of FIG. 10, a depth adjusting value is −1.

In this case, if depth adjustment is performed, the 3D TV 100 adjusts the depth value of the 3D image from +2 to +1. Accordingly, as illustrated in FIG. 8, it can be seen that the depth values of the left eye image 1020 and the right eye image 1025 after depth adjustment is completed are adjusted to +1 respectively.

Subsequently, the 3D TV 100 inserts the OSD. In this case, the OSD is inserted to a location corresponding to the surface of the screen where the depth value is 0. Accordingly, as illustrated in FIG. 8, in the left eye image 1030 and the right eye image 1035 where the OSD insertion is completed, the depth value of the OSD is 0.

As such, since the OSD is inserted after depth adjustment is completed, the 3D TV 100 may maintain the depth value of the OSD at 0 regardless of depth adjustment.

Fourthly, a method for deactivating a depth adjusting function of the depth adjusting unit 136 by the 3D TV 100 when an OSD is displayed will be explained with reference to FIG. 11.

Figure 11:
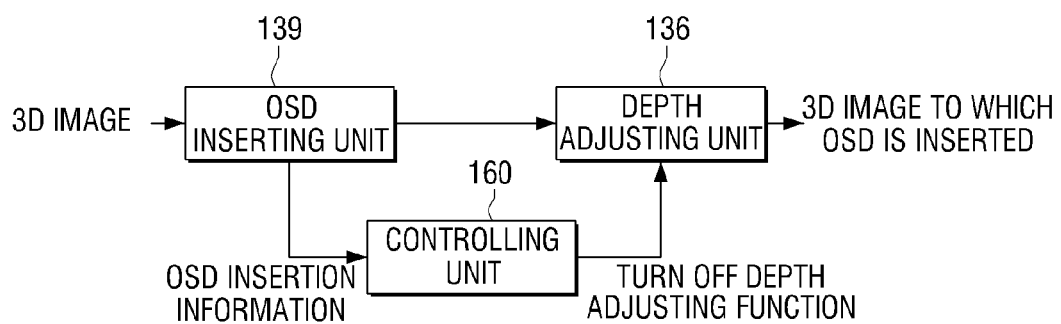
FIG. 11 is a view illustrating a configuration where a depth adjusting unit is deactivated when an OSD is inserted according to another exemplary embodiment.

FIG. 11 is a view illustrating a configuration where the depth adjusting unit 136 is deactivated when an OSD is inserted according to another exemplary embodiment. As illustrated in FIG. 11, the controlling unit 160 receives information regarding whether the OSD is inserted from the OSD inserting unit 139. If it is determined that the OSD is inserted, the controlling unit 160 deactivates the depth adjusting function of the depth adjusting unit 136.

If an OSD is displayed, a user usually focuses on the OSD rather than the image screen. Therefore, the user may not feel dizzy even though the depth of a 3D image is not adjusted. Accordingly, if an OSD is displayed on the screen, the controlling unit 160 may deactivate the depth adjusting function so as not to change the depth of the OSD.

As described above, the 3D TV 100 may maintain the depth value of the OSD at a certain value regardless of depth adjustment since depth adjustment is not performed if the OSD is inserted.

Fifthly, a method for maintaining the depth of an OSD when a 3D image including the OSD is input from an external apparatus will be explained with reference to FIGS. 12 to 14.

Figure 12:
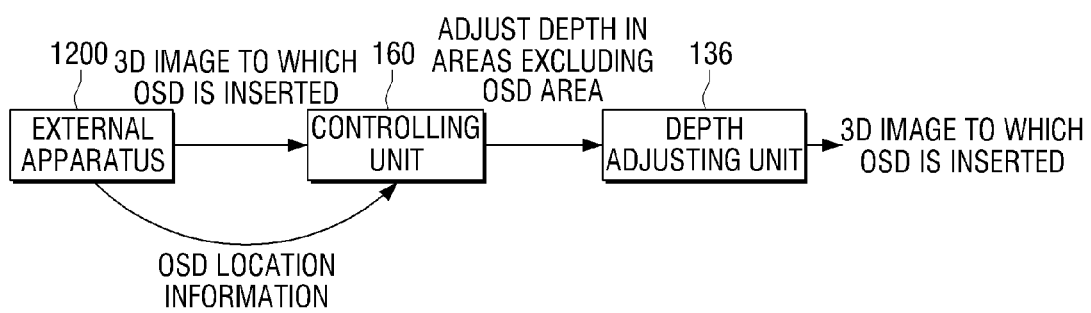
FIG. 12 is a view illustrating a configuration where a 3D image with an OSD is input from an external apparatus according to another exemplary embodiment.

FIG. 12 is a view illustrating a configuration where a 3D image with an OSD is input from an external apparatus 1200 according to another exemplary embodiment. As illustrated in FIG. 12, the 3D TV 100 may receive a 3D image to which an OSD is inserted from the external apparatus 1200. In this case, the OSD displayed on the screen is related to the functions of the external apparatus. For example, if the external apparatus is a BD player, the A/V interface 120 may receive a 3D image to which an OSD regarding a BD player menu is inserted from the BD player.

In this case, the controlling unit 160 detects information regarding the location of the OSD from the input 3D image. For example, the controlling unit 160 may detect an area with no movement in the 3D image as an OSD area since there is no movement of image in the OSD area. If a boundary is a vertical or horizontal straight line, or a specific curve or diagram, the controlling unit 160 may recognize the inside of the boundary as an OSD area.

The controlling unit 160 recognizes an OSD area based on detected information regarding the location of an OSD. Subsequently, the controlling unit 160 adjusts the depth of areas excluding the OSD area so as to maintain the depth of the OSD to be displayed on the screen at a specific depth.

However, if an external apparatus transmits information regarding an OSD location along with a 3D image, the 3D TV 100 may not go through the process of detecting the OSD area and may recognize the OSD area based on the received information regarding the OSD location.

This will be explained in detail with reference to FIG. 13. FIG. 13 is a view illustrating the process of adjusting an area except for an OSD if a 3D image with the OSD is input from an external apparatus according to another exemplary embodiment. In FIG. 13, the numbers below the 3D image refer to the depth values of the 3D image and the numbers above the OSD refer to the depth values of the OSD.

Figure 13:
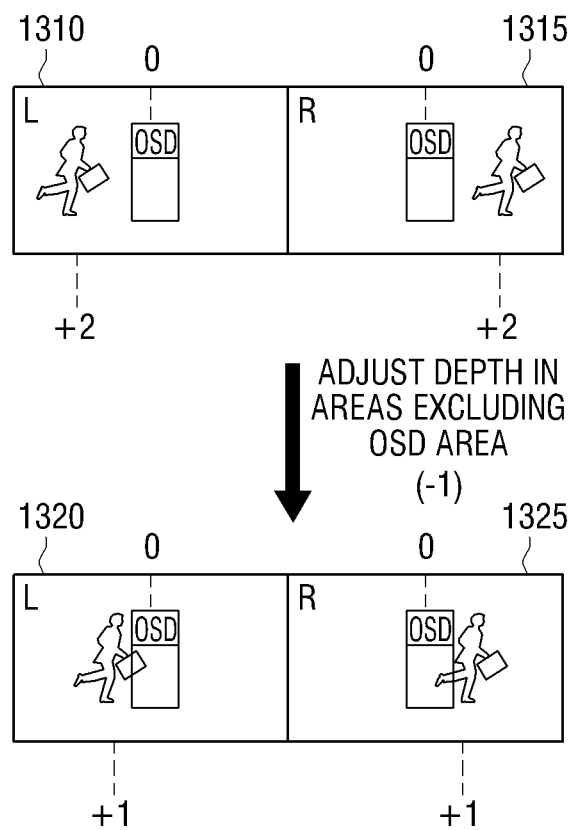
FIG. 13 is a view illustrating the process of adjusting an area except for an OSD if a 3D image with the OSD is input from an external apparatus according to another exemplary embodiment.

As illustrated in FIG. 13, the depth values of the left eye image 1310 and the right eye image 1315 constituting the input 3D image are +2 respectively. In addition, it can be seen that an OSD is included in the input image, and the depth values of the OSD included in the left eye image 1310 and the right eye image 1315 are 0 respectively. In the case of FIG. 13, a depth adjusting values is −1.

Subsequently, the 3D TV 100 detects an area where the OSD is inserted and extracts information regarding the location of the OSD. The 3D TV 100 then identifies an area where the OSD is displayed using the information regarding the OSD insertion location. The 3D TV 100 adjusts the depth in areas excluding the area where the OSD is displayed.

Accordingly, if depth adjustment is performed, the depth value of the OSD is not changed and only the depth value of the 3D image is changed. That is, as illustrated in FIG. 13, in the left eye image 1320 and the right eye image 1325 after depth adjustment is completed, it can be seen that the depth value of the 3D image is adjusted from +2 to +1 while the depth value of the OSD remains at 0.

If the above process is repeated, the 3D TV 100 may maintain the depth value of the OSD at 0 regardless of depth adjustment even if a 3D image to which the OSD is inserted is input.

In addition, a method for deactivating a depth adjusting function may be used, and this will be explained with reference to FIG. 14.

Figure 14:
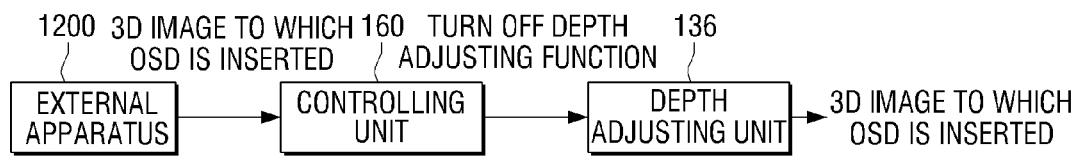
FIG. 14 is a view illustrating a configuration where a depth adjusting unit is deactivated if a 3D image with an OSD is input according to another exemplary embodiment.

FIG. 14 is a view illustrating a configuration where the depth adjusting unit 136 is deactivated if a 3D image with an OSD is input according to another exemplary embodiment. As illustrated in FIG. 14, the controlling unit 160 determines whether an OSD is inserted to a 3D image input from the external apparatus 1200. If it is determined that the OSD is inserted, the controlling unit 160 deactivates the depth adjusting function of the depth adjusting unit 136.

If an OSD is included in the input 3D image, a user usually focuses on the OSD rather than the image screen. Therefore, the user may not feel dizzy even though the depth of the 3D image is not adjusted. Accordingly, the controlling unit 160 maintains the depth of the OSD by deactivating the depth adjusting function of the controlling unit 160.

As such, the 3D TV 100 may maintain the depth value of the OSD since depth adjustment is not performed in the 3D image to which the OSD is inserted.

In the exemplary embodiment, the display apparatus is a 3D TV, but this is only an example. The display apparatus may be any apparatus which can display a 3D image, such as a 3D monitor, a 3D notebook computer, and so forth.

Although a few exemplary embodiments have been shown and described, it would be appreciated by those skilled in the art that changes may be made in the exemplary embodiment without departing from the principles and spirit of the invention, the scope of which is defined in the claims and their equivalents.

What is claimed is:

1. A display apparatus displaying a three-dimensional (3D) image, the display apparatus comprising;
    a depth adjusting unit configured to adjusts a depth of the 3D image, the depth being determined based on a manual input of a user; and
    a controlling unit configured to, if the depth of the 3D image is adjusted by the depth adjusting unit corresponding to the manual input of the user, controls to maintain a depth of an on-screen display (OSD) to be displayed on a screen,
    wherein the depth of the 3D image is independently adjustable with respect to the depth of the OSD.

2. The apparatus as claimed in claim 1, further comprising:
    an OSD inserting unit which generates and inserts the OSD to the 3D image.

3. The apparatus as claimed in claim 2, wherein the controlling unit maintains the depth of the OSD to be displayed on the screen at a specific depth by controlling the OSD inserting unit to insert the OSD by inversely applying a depth adjusting value.

4. The apparatus as claimed in claim 2, wherein the controlling unit maintains the depth of the OSD to be displayed on the screen at the specific depth by recognizing an area where the OSD is displayed based on information regarding a location where the OSD is inserted and adjusting a depth in areas excluding the area where the OSD is displayed.

5. The apparatus as claimed in claim 2, wherein the OSD inserting unit inserts the OSD to the 3D image of which depth is adjusted by the depth adjusting unit.

6. The apparatus as claimed in claim 2, wherein the depth of the 3D image is adjusted by the depth adjusting unit, and then the OSD inserting unit inserts the OSD to the 3D image of which the depth is adjusted.

7. The apparatus as claimed in claim 1, wherein the 3D image is input from an external apparatus while including the OSD.

8. The apparatus as claimed in claim 7, wherein the controlling unit maintains the depth of the OSD to be displayed on the screen at a specific depth by detecting information regarding the location of the OSD, recognizing an area where the OSD is displayed based on the detected information regarding a location of the OSD, and adjusting a depth in areas excluding the area where the OSD is displayed.

9. The apparatus as claimed in claim 7, wherein the controlling unit maintains the depth of the OSD to be displayed on the screen at a specific depth by receiving information regarding the location of the OSD from the external apparatus, recognizing an area where the OSD is displayed based on the received information regarding the location of the OSD, and adjusting a depth in areas excluding the area where the OSD is displayed.

10. The apparatus as claimed in claim 7, wherein the controlling unit maintains the depth of the OSD to be displayed on the screen at a specific depth by deactivating a depth adjusting function of the depth adjusting unit if the 3D image including the OSD is received.

11. The apparatus as claimed in claim 1, wherein the depth of the OSD is maintained at a specific depth to be displayed on the screen, and the specific depth is a depth corresponding to a location of the screen of the display apparatus.

12. The apparatus as claimed in claim 1, wherein the depth of the OSD is maintained at a specific depth to be displayed on the screen, and the specific depth corresponds to a depth of an image surrounding an area where the OSD is displayed.

13. The apparatus as claimed in claim 1, wherein the depth of the OSD is maintained at a specific depth to be displayed on the screen, and the specific depth corresponds to a deepest depth in the 3D image.

14. The apparatus as claimed in claim 1, wherein the manual input for adjusting the depth of the 3D image is received via a remote control, and wherein depth of the OSD before adjustment of the depth of the 3D image via remote control is a same as a depth of the OSD after adjustment of the depth of the 3D image.

15. The apparatus as claimed in claim 14, wherein the depth of the OSD before adjustment of the depth of the 3D image via remote control and the depth of the OSD after adjustment of the depth of the 3D image are both zero-depth.

16. A method for providing an on-screen display (OSD) in a display apparatus displaying a three-dimensional (3D) image, the method comprising:
receiving the 3D image;
adjusting a depth of the 3D image, the depth being determined based on a manual input of a user; and
if the depth of the 3D image is adjusted, maintaining a depth of the OSD to be displayed on a screen,
wherein the depth of the 3D image is independently adjustable with respect to the depth of the OSD.

17. The method as claimed in claim 16, further comprising: generating and inserting the OSD to the 3D image.

18. The method as claimed in claim 17, wherein the maintaining comprises maintaining the depth of the OSD to be displayed on the screen at a specific depth by inserting the OSD by inversely applying a depth adjusting value.

19. The method as claimed in claim 17, wherein the maintaining comprises:
recognizing an area where the OSD is displayed based on information regarding a location where the OSD is inserted; and
maintaining the depth of the OSD to be displayed on the screen at a specific depth by adjusting a depth in areas excluding the area where the OSD is displayed.

20. The method as claimed in claim 17, wherein the depth of the 3D image is adjusted, and then the OSD is inserted to the 3D image of which the depth is adjusted.

21. The method as claimed in claim 16, wherein the receiving comprises receiving the 3D image to which the OSD is inserted from an external apparatus.

22. The method as claimed in claim 21, wherein the maintaining comprises:
detecting information regarding a location of the OSD from the received 3D image;
recognizing an area where the OSD is displayed based on the detected information regarding the location of the OSD; and
maintaining the depth of the OSD to be displayed on the screen at a specific depth by adjusting a depth in areas excluding the area where the OSD is displayed.

23. The method as claimed in claim 21, wherein the maintaining comprises:
receiving information regarding a location of the OSD from the external apparatus,
recognizing an area where the OSD is displayed based on the received information regarding the location of the OSD, and
maintaining the depth of the OSD to be displayed on the screen at a specific depth by adjusting a depth in areas excluding the area where the OSD is displayed.

24. The method as claimed in claim 21, wherein the maintaining comprises:
maintaining the depth of the OSD to be displayed on the screen at a specific depth by deactivating a depth adjusting function if the 3D image including the OSD is received.

25. The method as claimed in claim 16, wherein the depth of the OSD is maintained at a specific depth to be displayed on the screen, and the specific depth is a depth corresponding to a location of the screen of the display apparatus.

26. The method as claimed in claim 16, wherein the depth of the OSD is maintained at a specific depth to be displayed on the screen, and the specific depth corresponds to a depth of an image surrounding an area where the OSD is displayed.

27. The method as claimed in claim 16, wherein the depth of the OSD is maintained at a specific depth to be displayed on the screen, and the specific depth corresponds to a deepest depth in the 3D image.

28. The method as claimed in claim 16, wherein the manual input for adjusting the depth of the 3D image is received via a remote control, and wherein depth of the OSD before adjustment of the depth of the 3D image via remote control is a same as a depth of the OSD after adjustment of the depth of the 3D image.

29. The method as claimed in claim 28, wherein the depth of the OSD before adjustment of the depth of the 3D image via remote control and the depth of the OSD after adjustment of the depth of the 3D image are both zero-depth.

30. A display apparatus displaying a 3D image, the display apparatus comprising;
a depth adjusting unit configured to adjust a depth of the 3D image, the depth being determined based on a manual input of a user; and
an OSD inserting unit configured to generate and insert the OSD to the 3D image,
wherein the OSD inserting unit inserts the OSD to the 3D image of which depth is adjusted by the depth adjusting unit,
wherein the depth of the 3D image is independently adjustable with respect to a depth of the OSD.

31. The apparatus as claimed in claim 30, wherein the depth is a specific depth corresponding to a location of a screen of a display apparatus.

32. The apparatus as claimed in claim 30, wherein the manual input for adjusting the depth of the 3D image is received via a remote control, and wherein depth of the OSD before adjustment of the depth of the 3D image via remote control is a same as a depth of the OSD after adjustment of the depth of the 3D image.

33. The apparatus as claimed in claim 32, wherein the depth of the OSD before adjustment of the depth of the 3D image via remote control and the depth of the OSD after adjustment of the depth of the 3D image are both zero-depth.

34. The apparatus as claimed in claim 30, wherein, even if the depth of the 3D image is adjusted by the depth adjusting unit, a depth of the OSD is maintained.

35. The apparatus as claimed in claim 34, wherein the depth of the OSD is maintained and displayed at zero-depth.

36. A display apparatus displaying a 3D image, the display apparatus comprising:
a depth adjusting unit configured to adjust a depth of the 3D image based on a manual input of a user;
an OSD inserting unit configured to generate and insert an OSD to the 3D image,
wherein, even if the depth of the 3D image is adjusted by the depth adjusting unit, a depth of the OSD is maintained, wherein the depth of the 3D image is independently adjustable with respect to a depth of the OSD.

37. The apparatus as claimed in claim 36, wherein the depth of the OSD is maintained at a specific depth.

38. The apparatus as claimed in claim 36, wherein the OSD inserting unit inserts the OSD to the 3D image is adjusted by the depth adjusting unit.

39. The method as claimed in claim 36, wherein the manual input for adjusting the depth of the 3D image is received via a remote control, and wherein depth of the OSD before adjustment of the depth of the 3D image via remote control is a same as a depth of the OSD after adjustment of the depth of the 3D image.

* * * * *